(12) United States Patent
Bruno et al.

(10) Patent No.: US 8,875,852 B2
(45) Date of Patent: Nov. 4, 2014

(54) FLOW-CONTROL PASSIVE VALVE AND DAMPING-ADJUSTABLE SHOCK ABSORBER COMPRISING SAME

(75) Inventors: Walter Bruno, Asti (IT); Gianfranco De Lillo, Asti (IT)

(73) Assignee: Sistemi Sospensioni S.p.A., Corbetta (Milano) (IT)

( * ) Notice: Subject to any disclaimer, the term of this patent is extended or adjusted under 35 U.S.C. 154(b) by 153 days.

(21) Appl. No.: 13/393,609

(22) PCT Filed: Sep. 2, 2010

(86) PCT No.: PCT/IB2010/053951
§ 371 (c)(1),
(2), (4) Date: Mar. 1, 2012

(87) PCT Pub. No.: WO2011/027314
PCT Pub. Date: Mar. 10, 2011

(65) Prior Publication Data
US 2012/0168268 A1    Jul. 5, 2012

(30) Foreign Application Priority Data
Sep. 3, 2009 (IT) .............................. TO2009A0681

(51) Int. Cl.
*F16F 9/50* (2006.01)
*F16F 9/32* (2006.01)
(52) U.S. Cl.
CPC ..................................... *F16F 9/325* (2013.01)
USPC .................. 188/282.6; 188/282.8; 188/322.2
(58) Field of Classification Search
USPC ........... 188/282.6, 282.8, 282.5, 322.13, 313, 188/322.2
See application file for complete search history.

(56) References Cited

U.S. PATENT DOCUMENTS

| 2,732,039 | A  | 1/1956 | Funkhouser et al. |
| 5,398,787 | A  | 3/1995 | Woessner et al. |
| 5,439,085 | A  | 8/1995 | Woessner |
| 6,079,526 | A  | 6/2000 | Nezu et al. |
| 6,182,805 | B1 | 2/2001 | Kashiwagi et al. |

FOREIGN PATENT DOCUMENTS

| DE | 3719113 C1    | 8/1988 |
| DE | 196 52 819 A1 | 7/1997 |
| DE | 196 24 898 A1 | 1/1998 |
| DE | 197 34 522 A1 | 2/1998 |
| EP | 0 490 262 A2  | 6/1992 |
| EP | 0 783 985 A1  | 7/1997 |

OTHER PUBLICATIONS

International Search Report for PCT/IB2010/053951.

*Primary Examiner* — Melanie Torres Williams
(74) *Attorney, Agent, or Firm* — Howard & Howard Attorneys PLLC

(57) ABSTRACT

A flow-control passive valve controls flow of fluid between an upstream space at high pressure and downstream space at low pressure. The valve comprises a valve body in fluid communication with the upstream and downstream spaces and within which are defined first and second spaces. A movable member is slidably received in a body chamber, and a force is applied to the member tending to keep it in a given "non-working" position. Metering discs meter the flow from the upstream to downstream space through the body and comprise first, second, and third fixed restrictors and first and second variable restrictors. Pressure in the first space is lower than that in the upstream space via a pressure drop through the first fixed restrictor while pressure in the second space is variable between the pressure in the first space and that in the downstream space depending on the position of the member.

17 Claims, 5 Drawing Sheets

FLOW-CONTROL PASSIVE VALVE AND DAMPING-ADJUSTABLE SHOCK ABSORBER COMPRISING SAME

CROSS-REFERENCE TO RELATED APPLICATIONS

This application claims benefit of PCT Patent Application PCT/IB2010/053951 filed on Sep. 2, 2010 and entitled "Flow-Control Passive Valve and Damping-Adjustable Shock-Absorber Comprising the Same," which claims benefit of Italian Patent Application TO2009A000681 filed on Sep. 3, 2009 and entitled "Flow-Control Passive Valve and Damping-Adjustable Shock-Absorber Comprising the Same."

BACKGROUND OF INVENTION

1. Field of Invention

The invention relates generally to a flow-control passive valve for controlling flow of a fluid between a high-pressure upstream space and a low-pressure downstream space.

2. Description of Related Art

Damping-adjustable shock absorbers, which are able to change their damping characteristics under control of an electronic-control unit to modify the behavior of the vehicle suspension system depending, for instance, on the road conditions and/or on the vehicle driving conditions, are nowadays more and more often used, particularly in the automotive field.

With reference to FIG. 1 of the attached drawing, a damping-adjustable shock absorber according to a known embodiment is generally indicated 10 and basically comprises:

a pressure tube 12 enclosing a pressure chamber 14 filled with a damping fluid (typically oil);

a plunger 16 that is slidably mounted inside the pressure chamber 14 of the pressure tube 12 and divides it into a lower pressure chamber 14a and an upper pressure chamber 14b;

a rod 18 that carries at an end thereof the plunger 16 and projects on the opposite side from the pressure tube 12;

an outer tube 20;

an intermediate tube 22 that is fitted onto the pressure tube 12 and encloses a by-pass chamber 24 that communicates with the upper pressure chamber 14b through communication holes 26 provided in the pressure tube 12; and a flow-control active valve 28 (typically a solenoid valve) that is connected to the intermediate tube 22 and is arranged to control the flow of the damping fluid between the pressure chamber 14 and the by-pass chamber 24.

FIG. 2 of the attached drawing shows a typical "pressure-flow-rate characteristic" curve of the damping-adjustable shock absorber according to the prior art illustrated in FIG. 1, with different values of the driving current of the flow-control solenoid valve. As can be seen, the "pressure-flow-rate characteristic" curves have each a first ascending section (low flow-rate values), the gradient of which increases along with the driving current of the solenoid valve, and a second section (high flow-rate values) that is also ascending, the gradient of which is lower than that of the first section. In an embodiment, "pressure-flow-rate characteristic" curves have a first ascending section and a constant, if not even descending, second section adjacent to the first one.

An example of a "pressure-flow-rate characteristic" curve is shown in FIG. 3 of the attached drawing, where "α" indicates the gradient of the first ascending section—in particular, a substantially linearly ascending section—of the curve (from a flow-rate value equal to zero to a flow-rate value indicated "Q*") and "p*" indicates the constant value of the pressure starting from the flow-rate value "Q*." Nowadays, in order to obtain an operation of the shock absorber that is as closest as possible to the ideal one represented by the "pressure-flow-rate characteristic" curve of FIG. 3, the flow-control solenoid valve can be operated with suitable driving logics. It is, thus, possible to obtain a second section of the "pressure-flow-rate characteristic" curve that has a lower gradient than that of the first section, but that is still typically ascending instead of constant.

It is an object of the invention to allow to obtain a "pressure-flow-rate characteristic" curve in which a first ascending section is immediately followed by a second constant section, as in the curve shown in FIG. 3, or even by a second descending section.

SUMMARY OF INVENTION

The invention overcomes the disadvantages in the related art in a flow-control passive valve for controlling flow of a fluid between an upstream space at high pressure and a downstream space at low pressure. The flow-control passive valve comprises a valve body in fluid communication on one side with the upstream space and on another side with the downstream space. A first space and a second space are defined within the valve body. A movable member is slidably received in a chamber of the valve body. Resiliency applies on the movable member a force tending to keep the movable member in a given "non-working" position. Metering discs meter the flow of the fluid from the upstream space to the downstream space through the valve body. The metering discs include a first fixed restrictor through which the first space is in fluid communication with the upstream space, a second fixed restrictor through which the first space is in fluid communication with the downstream space, a first variable restrictor a restriction amount of which depends on a position of the movable member and through which the first space is in fluid communication with the downstream space in substantial parallel to the second fixed restrictor, a second variable restrictor a restriction amount of which depends on the position of the movable member and through which the first space is in fluid communication with the second space, and a third fixed restrictor through which the second space is in fluid communication with the downstream space. A pressure in the first space is lower than a pressure in the upstream space as a result of a pressure drop through the first fixed restrictor while a pressure in the second space is variable between the pressure in the first space and the pressure in the downstream space depending on the position of the movable member.

The invention overcomes the disadvantages in the related art also in a damping-adjustable shock absorber for an active or a semi-active suspension system for a motor vehicle, the shock absorber comprising at least one of the flow-control passive valve. The invention overcomes the disadvantages in the related art also in an active or a semi-active suspension system for a motor vehicle, the suspension system comprising at least one of the shock absorber.

Other objects, features, and advantages of the invention are readily appreciated as the invention becomes better understood while the subsequent detailed description of embodiments of the invention is read taken in conjunction with the accompanying drawing thereof.

BRIEF DESCRIPTION OF EACH FIGURE OF DRAWING OF INVENTION

DETAILED DESCRIPTION OF EMBODIMENTS OF INVENTION

In the following description, only the flow-control passive valve interposed between the intermediate tube and the flow-control active valve of a damping-adjustable shock absorber is explained in detail. As far as the overall structure and operation of the shock absorber are concerned, reference can be made to the explanation given in the introductory part of the description in connection with FIG. 1.

In the following description and claims, the term "axial" indicates a direction coinciding with or parallel to the axis of the flow-control passive valve while the terms "radial" or "transverse" indicate any direction perpendicular to that axis.

Figure 1:
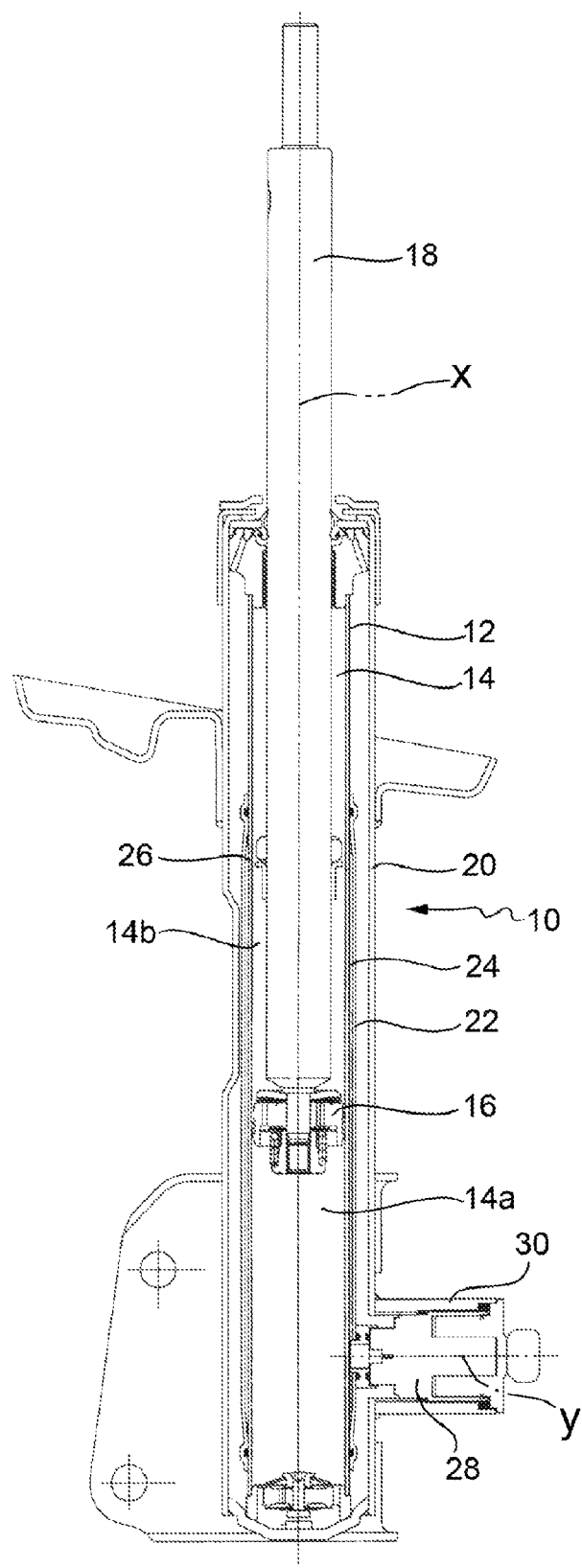
FIG. 1 shows an axial sectional view of a damping-adjustable shock absorber according to the prior art.
Figure 2:
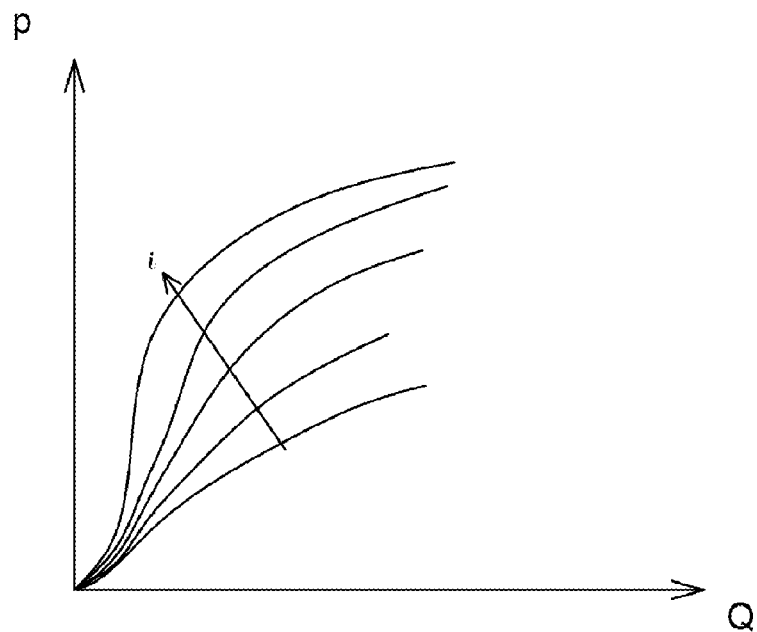
FIG. 2 shows an example of a "pressure-flow-rate characteristic" curve of the damping-adjustable shock absorber of FIG. 1.
Figure 3:
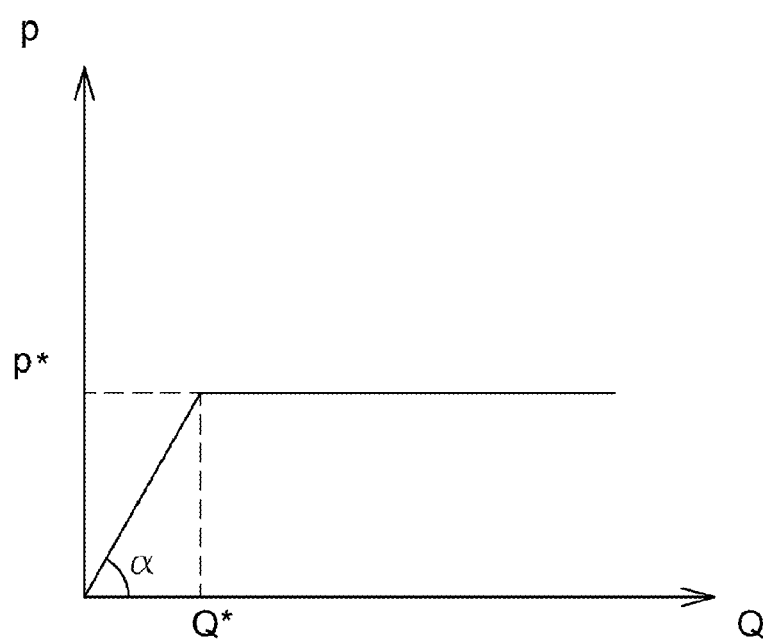
FIG. 3 shows an example of a "pressure-flow-rate characteristic" curve of a damping-adjustable shock absorber.
Figure 4:
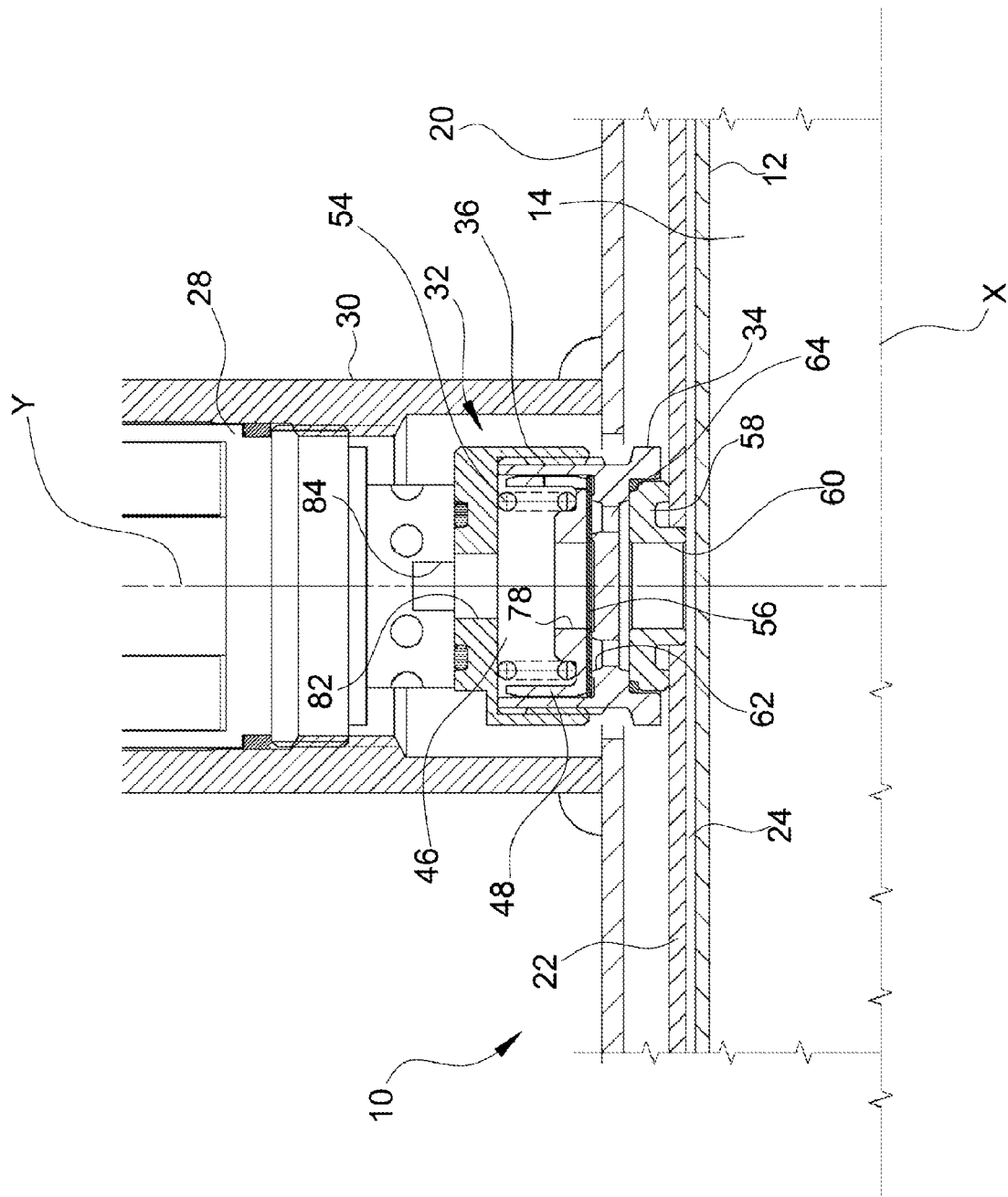
FIG. 4 is an axial sectional view on an enlarged scale that shows a flow-control passive valve according to an embodiment of the invention interposed between the intermediate tube and the flow-control active valve of a damping-adjustable shock absorber of the same type as the one shown in FIG. 1.

With reference to FIG. 4, where parts and elements identical or corresponding to those of FIG. 1 have been given the same reference numerals, a damping-adjustable shock absorber, particularly for motorcar suspensions, is generally indicated at 10 and comprises a pressure tube 12 enclosing a pressure chamber 14 filled with damping fluid (typically oil), an outer tube 20, an intermediate tube 22 that is fitted onto the pressure tube 12 and encloses a by-pass chamber 24, and a flow-control active valve 28 (made, for instance, as a solenoid valve) that is connected to the intermediate tube 22 and is arranged to control the flow of the damping fluid between the pressure chamber 14 and the by-pass chamber 24.

The flow-control active valve 28 (hereinafter simply indicated as "active valve") is attached to the outer tube 20 so as to extend along an axis (indicated "Y" in FIGS. 1 and 4) substantially perpendicular to the axis (indicated "X" in FIGS. 1 and 4) of that tube—that is to say, to the axis of the shock absorber. In particular, in the embodiment, the active valve 28 is screwed onto an internally threaded tubular-mounting element 30 that is rigidly connected, in turn, to the outer tube 20 (for instance, by welding).

The shock absorber 10 further comprises a flow-control passive valve, generally indicated at 32. In the illustrated embodiment, the flow-control passive valve 32 (hereinafter simply indicated as "passive valve") is axially interposed between the intermediate tube 22 and the active valve 28 so as to act in series with the active valve 28. However, different arrangements of the passive valve inside the shock absorber are conceivable.

Figure 5:
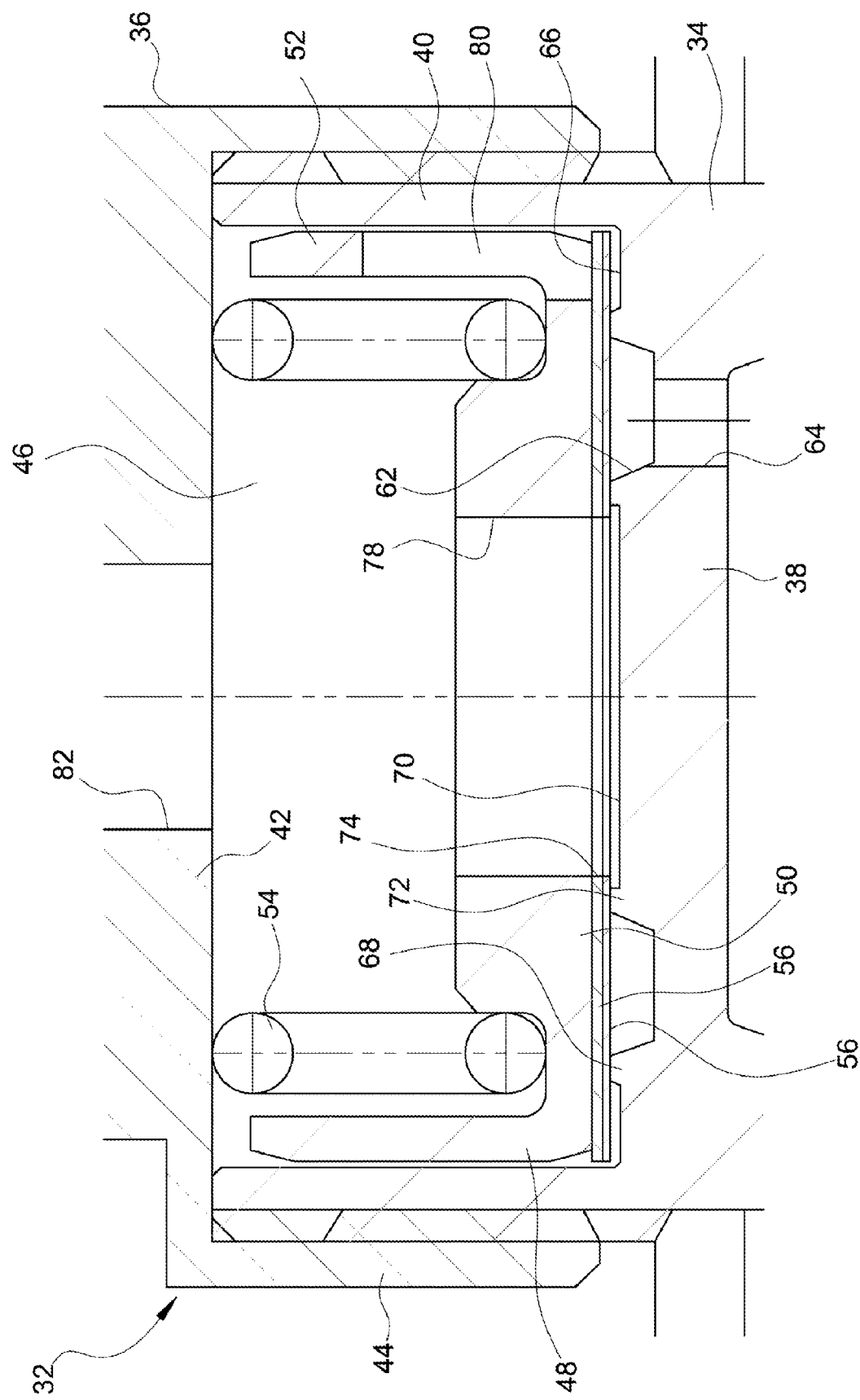
FIG. 5 is an axial sectional view on a further enlarged scale that shows a detail of the flow-control passive valve of FIG. 4.
Figure 6:
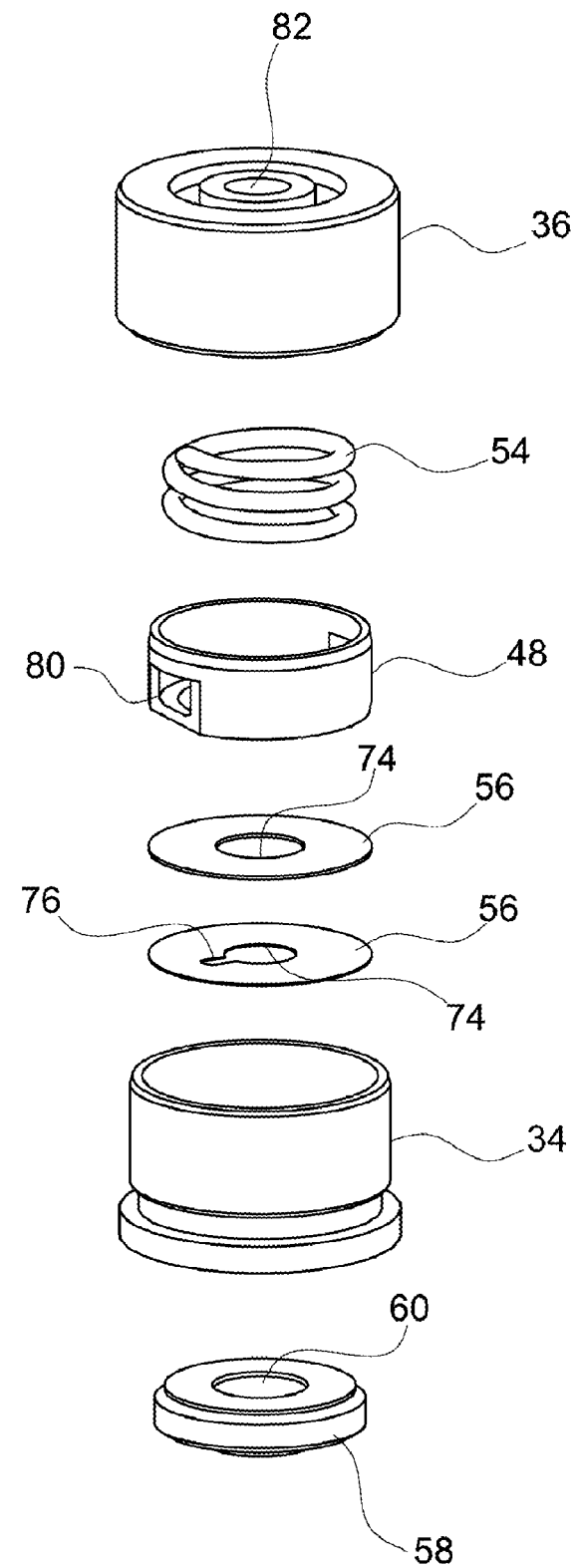
FIG. 6 is an exploded view of the flow-control passive valve of FIG. 4.

With reference to FIGS. 5 and 6 as well, the passive valve 32 basically comprises:

a valve body including a first cup-shaped valve-body element 34 arranged on the side of the intermediate tube 22 and a second cup-shaped valve-body element 36 arranged on the side of the active valve 28, wherein the first valve-body element 34 integrally forms a bottom wall 38 facing the intermediate tube 22 and a cylindrical lateral wall 40 while the second valve-body element 36 integrally forms a bottom wall 42 facing the active valve 28 and a cylindrical lateral wall 44, the bottom walls 38, 42 defining along with the cylindrical lateral wall 40 of the first valve-body element 34 a cylindrical chamber 46 having an axis substantially coinciding with the axis "Y" defined above;

a cup-shaped movable member 48 accommodated in the cylindrical chamber 46 of the valve body so as to slide in the direction of the axis "Y" of that chamber, the movable member 48 integrally forming a bottom wall 50 facing the bottom wall 38 of the first valve-body element 34 and a cylindrical lateral wall 52 guided in the cylindrical lateral wall 40 of the first valve-body element 34;

a cylindrical helical spring 54 axially interposed between the bottom wall 42 of the second valve-body element 36 and the bottom wall 50 of the movable member 48 so as to apply on the movable member 48 a force tending to urge that member toward the bottom wall 38 of the first valve-body element 34; and a plurality of metering discs 56 interposed between the bottom wall 38 of the first valve-body element 34 and the bottom wall 50 of the movable member 48.

In the illustrated embodiment, the two valve-body elements 34, 36 are secured to each other by engagement between an outer threading provided on the cylindrical lateral wall 40 of the first valve-body element 34 and an inner threading provided on the cylindrical lateral wall 44 of the second valve-body element 36. However, other ways to secure the two valve-body elements 34, 36 to each other may be envisaged.

A fitting 58 is axially interposed between the first valve-body element 34 and the intermediate tube 22 and has an axial through-hole 60 in fluid communication with the by-pass chamber 24 of the intermediate tube 22.

The bottom wall 38 of the first valve-body element 34 has, on its side facing the inside of the valve body (i.e., toward the cylindrical chamber 46) a first annular cavity 62 that is in fluid communication with the axial through-hole 60 of the fitting 58 and, via the latter, with the intermediate tube 22 through a plurality of holes 64 or through a single annular opening provided in the same bottom wall 38. A second annular cavity 66, of lower depth than that of the first annular cavity 62, is provided on the side of the bottom wall 38 facing the inside of the valve body. This second annular cavity 66 extends radially up to the inner surface of the cylindrical lateral wall 40 and is separated from the first annular cavity 62 by a first annular projection 68. A further cavity 70 of circular shape, also of lower depth than that of the first annular cavity 62, is provided in the center of the side of the bottom wall 38 facing the inside of the valve body and is separated from the first annular cavity 62 by a second annular projection 72 extending in height up to the same level as the first annular projection 68.

The set of metering discs 56 stacked on each other is axially interposed in a slidable way between the bottom wall 38 of the first valve-body element 34 and the bottom wall 50 of the movable member 48 and, in the "closed" condition of the passive valve (which condition is illustrated in FIGS. 4-6), rests on the annular projections 68, 72 of the bottom wall 38. The metering discs 56 have each a center hole 74 the maximum radial size of which is smaller than the minimum radial size of the circular cavity 70 of the bottom wall 38. In an embodiment, the center hole 74 is made as a circular hole of smaller radius than that of the circular cavity 70. At least one radial opening 76 (which can be seen only in FIG. 6) extends from the center hole 74 of the metering discs 56 (in an embodiment, at least of the bottom metering disc, i.e., the metering disc directly in contact, in the "closed" condition of the valve, with the annular projections 68, 72) to allow, also in the "closed" condition of the passive valve, the damping fluid flowing from the intermediate tube 22 to the first annular cavity 62 of the bottom wall 38, in the manner described above, to flow toward the circular cavity 70 of the bottom wall 38 bypassing the second annular projection 72. In an embodiment, the metering discs 56 have an outer diameter smaller than that of the cylindrical chamber 46 of the valve body so as to define with the inner surface of the cylindrical lateral wall 40 of that element a restrictor (that is to say, a passage having a reduced cross-section area) for the fluid flowing from the second annular cavity 66 to the cylindrical chamber 46.

In the bottom wall 50 of the movable member 48, a center axial hole 78 is provided, whereby the cylindrical chamber 46 of the valve body is in fluid communication with the circular cavity 70 of the bottom wall 38 of the first valve-body element 34 through that hole 78 as well as through the center holes 74 of the metering discs 56. Moreover, in the cylindrical lateral wall 52 of the movable member 48, one or more openings 80 are provided that are made in such a manner that they put the second annular cavity 66 of the bottom wall 38 of the first valve-body element 34 in fluid communication with the cylindrical chamber 46 of the valve body through the above-defined restrictor. The openings 80, thus, have the function of allowing the fluid collecting in the second annular cavity 66 as a result of the upward movement of the movable member 48 to flow to the cylindrical chamber 46 of the valve body and, from here, to the active valve 28. The openings 80 may be radial openings made in the cylindrical lateral wall 52 of the movable member 38, axial openings made in the bottom wall 50 of that member, or, again, a combination of these two solutions, as in the illustrated embodiment.

Finally, the bottom wall 42 of the second valve-body element 36 has a center axial hole 82 in fluid communication with an inlet 84 of the active valve 28 to allow the fluid contained in the cylindrical chamber 46 of the valve body to flow toward that valve.

The operation of the passive valve 32 is described now. In the "closed" condition of the valve, the movable member 48 is subjected to the elastic force of the spring 54, which tends to urge that member, along with the metering discs 56, against the bottom wall 38 of the first valve-body element 34 (i.e., to keep the valve closed) and to the force applied by the pressure "$p_1$" of the fluid contained in the first annular cavity 62 of the bottom wall 38, which has a value close to that of the pressure "$p_H$" (high pressure) in the by-pass chamber 24 of the intermediate tube 22, the difference "$p_H$–$p_1$" being due to the pressure drop through the holes 64. In such a condition, the radial opening (or the radial openings) 76 provided at least in the bottom metering disc 56 allows a minimum flow of fluid from the first annular cavity 62 to the cylindrical chamber 46 of the valve body and, from here, to the active valve 28. The second annular cavity 66 is in fluid communication (through the restrictor defined between the radially outer edge of the metering discs 56 and the cylindrical lateral wall 40 of the first valve-body element 34 and through the openings 80 provided in the movable member 48) with the cylindrical chamber 46 and, hence, with the active valve 28. The value "$p_2$" of the pressure in the second annular cavity 66 is, therefore, close to the value "$p_L$" of the pressure (low pressure) downstream of the passive valve 32.

When the pressure "$p_1$" of the fluid in the first annular cavity 62 is such as to overcome the elastic force of the spring 54, the movable member 48 moves away from the bottom wall 38, thereby allowing the metering discs 56 as well to move away from that wall. The fluid contained in the first annular cavity 62 can now flow toward the cylindrical chamber 46 not only directly through the passage defined between the bottom metering disc 56 and the second annular projection 72, but also indirectly through the second annular cavity 66, through the restrictor defined between the radially outer edge of the metering discs 56 and the cylindrical lateral wall 40 of the first valve-body element 34, and through the openings 80 provided in the movable member 48. The pressure drop due to the restrictor defined between the bottom metering disc 56 and the first annular projection 68 causes the pressure "$p_2$" in the second annular cavity 66 to be lower than the pressure "$p_1$" in the first annular cavity 62, the difference "$p_1$–$p_2$" progressively decreasing up to zero as a result of an increase in the opening degree of the valve (upward movement of the movable member 48). Accordingly, the effective value of the area on which the pressure "$p_1$" acts varies from a minimum value equal to the area of the first annular cavity 62 to a maximum value tending to the sum of the areas of the first and second annular cavities 62, 66.

It has been experimentally seen that the use of a flow-control passive valve made in the way illustrated above in a damping-adjustable shock absorber allows to obtain a "pressure-flow-rate characteristic" curve of the shock absorber with a second constant, if not even descending, section adjacent to a first ascending section.

The two fundamental parameters of the "pressure-flow-rate characteristic" curve of the shock absorber—that is to say, the gradient "$\alpha$" of the first (substantially linearly) ascending section and the constant value "$p^*$" (or the maximum value "$p^*$") of the second constant (or descending) section—can be adjusted independently of each other by suitably designing the components of the passive valve. In particular, the parameter "$\alpha$" depends on the geometrical characteristics of the radial opening (or of the radial openings) 76 of the bottom metering disc 56 through which the first annular cavity 62 of the bottom wall 38 of the first valve-body element 34 is in fluid communication with the cylindrical chamber 46 of the valve body while the parameter "$p^*$" depends on the pre-load of the spring 54 acting on the movable member 48.

As already stated above, even though the passive valve has been described herein in the specific case of its application to a damping-adjustable shock absorber, it can be used in any other application requiring to control the flow of a fluid between an upstream space at a high pressure "$p_H$" and a downstream space at a low pressure "$p_L$." In this connection, it can be said in general terms that the passive valve comprises a valve body inside which there are defined:

a main space (the first annular cavity 62 of the shock absorber 10) in fluid communication on the one side with the upstream space (the by-pass chamber 24 of the intermediate tube 22 of the shock absorber 10) through a first fixed restrictor (the holes 64) and on the other side with the downstream space (the active valve 28 of the shock absorber 10) both through a second fixed restrictor (the radial opening 76 in the bottom metering disc 56) and through a first variable restrictor (the passage between the bottom metering disc 56 and the second annular projection 72, the cross-section area of that passage depending on the upward movement of the movable member 48); and a secondary space (the second annular cavity 66) in fluid communication on the one side with the main space through a second variable restrictor (the passage between the bottom metering disc 56 and the first annular projection 68, the cross-section area of that passage depending on the upward movement of the movable member 48) and on the other side with the downstream space through a third fixed restrictor (the passage between the radially outer edge of the metering discs 56 and the cylindrical lateral wall 40 of the first valve-body element 34), whereby the pressure "$p_1$" in the main space is lower than the pressure "$p_H$" due to the pressure drop through the first fixed restrictor while the pressure "$p_2$" in the secondary space varies between the pressure "$p_1$" in the main space and the pressure "$p_L$" in the downstream space depending on the opening degree of the valve.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as it is specifically described above.

The invention claimed is:

1. A flow-control passive valve (32) for controlling flow of a fluid between an upstream space (22) at high pressure ($p_H$) and a downstream space (28) at low pressure ($p_L$), the flow-control passive valve (32) comprising:
   a valve body (34, 36) in fluid communication on one side (64) with the upstream space (22) and on another side (82) with the downstream space (28), a first space (62) and a second space (66) being defined within the valve body (34, 36);
   a movable member (48) slidably received in a chamber (46) of the valve body (34, 36);
   resiliency (54) applying on the movable member (48) a force tending to keep the movable member in a given "non-working" position; and
   metering discs (56, 64, 68, 72, 76) for metering the flow of the fluid from the upstream space (22) to the downstream space (28) through the valve body (34, 36), the metering discs (56, 64, 68, 72, 76) including:
      a first fixed restrictor (64) through which the first space (62) is in fluid communication with the upstream space (22);
      a second fixed restrictor (76) through which the first space (62) is in fluid communication with the downstream space (28);
      a first variable restrictor (56, 72) a restriction amount of which depends on a position of the movable member (48) and through which the first space (62) is in fluid communication with the downstream space (28) in substantial parallel to the second fixed restrictor (76);
      a second variable restrictor (56, 68) a restriction amount of which depends on the position of the movable member (48) and through which the first space (62) is in fluid communication with the second space (66);
      a third fixed restrictor (56, 40) through which the second space (66) is in fluid communication with the downstream space (28), wherein a pressure ($p_1$) in the first space (62) is lower than a pressure in the upstream space (22) as a result of a pressure drop through the first fixed restrictor (64) while a pressure ($p_2$) in the second space (66) is variable between the pressure ($p_1$) in the first space (62) and the pressure ($p_L$) in the downstream space (28) depending on the position of the movable member (48);
   wherein the valve body (34, 36) includes a bottom wall (38) having an opening (64) defining the first fixed restrictor (64), a top wall (42) having an opening (82) for connection with the downstream space (28), and a substantially cylindrical lateral wall (40); the chamber (46) of the valve body (34, 36) is a substantially cylindrical chamber defined by the bottom wall (38), by the top wall (42), and by the cylindrical lateral wall (40); the movable member (48) is slidable along a direction of an axis of the chamber (46) of the valve body (34, 36) and includes a bottom wall (50) facing the bottom wall (38) of the valve body (34, 36) and a substantially cylindrical lateral wall (52); the movable member (48) has a center hole (78) through which the chamber (46) is in fluid communication with the first space (62) via the second fixed restrictor (76) and the first variable restrictor (56, 72) as well as at least one opening (80) through which the chamber (46) is in fluid communication with the second space (66) via the third fixed restrictor (56, 40); the resiliency (54) applies on the movable member (48) the force tending to urge the bottom wall (50) of the movable member against the bottom wall (38) of the valve body (34, 36); the metering discs (56, 64, 68, 72, 76) further include at least one disc (56) that is substantially axially interposed between the bottom wall (38) of the valve body (34, 36) and the bottom wall (50) of the movable member (48) and has a center hole (74) in fluid communication with the center hole (78) of the bottom wall (50) of the movable member (48); and the at least one disc defines the second fixed restrictor (76), the first variable restrictor (56, 72), the second variable restrictor (56, 68), and the third fixed restrictor (56, 40).

2. The valve according to claim 1, wherein the second fixed restrictor (76) is defined by at least one substantially radial opening (76) provided in the at least one disc (56), the radial opening (76) debouching into the center hole (74) of the at least one disc (56).

3. The valve according to claim 1, wherein the first space (62) is a substantially annular cavity provided on a side of the bottom wall (38) of the valve body (34, 36) facing the chamber (46) and the first variable restrictor (56, 72) is defined between the at least one disc (56) and a first substantially annular projection (72) that is formed by the bottom wall (38) of the valve body (34, 36) and is delimited by a substantially radially inner edge of the annular cavity (62).

4. The valve according to claim 3, wherein the second space (68) is a substantially annular cavity provided on the side of the bottom wall (38) of the valve body (34, 36) facing the chamber (46) substantially radially outwardly of the annular cavity (62) defining the first space, the bottom wall (38) of the valve body (34, 36) forms a second substantially annular projection (68) that divides the first and second spaces (62, 66), and the second variable restrictor (56, 68) is defined between the at least one disc (56) and the second annular projection (72).

5. The valve according to claim 1, wherein the third fixed restrictor (56, 40) is defined between a radially outer edge of the at least one disc (56) and the cylindrical lateral wall (40) of the valve body (34, 36).

6. The valve according to claim 1, wherein the valve body (34, 36) includes a first element (34) forming the bottom wall (38) and the cylindrical lateral wall (40) and a second element (36) forming the top wall (42), the first and second elements (34, 36) being secured to each other.

7. A damping-adjustable shock absorber (10) for at least one of an active and a semi-active suspension system for a motor vehicle, the shock absorber comprising:
   at least one flow-control passive valve (32) for controlling flow of a fluid between an upstream space (22) at high pressure ($p_H$) and a downstream space (28) at low pressure ($p_L$), the flow-control passive valve (32) including:
      a valve body (34, 36) in fluid communication on one side (64) with the upstream space (22) and on another side

(82) with the downstream space (28), a first space (62) and a second space (66) being defined within the valve body (34, 36);

a movable member (48) slidably received in a chamber (46) of the valve body (34, 36);

resiliency (54) applying on the movable member (48) a force tending to keep the movable member in a given "non-working" position; and metering discs (56, 64, 68, 72, 76) for metering the flow of the fluid from the upstream space (22) to the downstream space (28) through the valve body (34, 36), the metering discs (56, 64, 68, 72, 76) having:

a first fixed restrictor (64) through which the first space (62) is in fluid communication with the upstream space (22);

a second fixed restrictor (76) through which the first space (62) is in fluid communication with the downstream space (28);

a first variable restrictor (56, 72) a restriction amount of which depends on a position of the movable member (48) and through which the first space (62) is in fluid communication with the downstream space (28) in substantial parallel to the second fixed restrictor (76);

a second variable restrictor (56, 68) a restriction amount of which depends on the position of the movable member (48) and through which the first space (62) is in fluid communication with the second space (66); and a third fixed restrictor (56, 40) through which the second space (66) is in fluid communication with the downstream space (28), wherein a pressure ($p_1$) in the first space (62) is lower than a pressure in the upstream space (22) as a result of a pressure drop through the first fixed restrictor 64 while a pressure ($p_2$) in the second space (66) is variable between the pressure ($p_1$ in the first space (62) and the pressure ($p_L$) in the downstream space (28) depending on the position of the movable member (48);

wherein the shock absorber comprises a pressure tube (12), an outer tube (20), an intermediate tube (22) fitted onto the pressure tube (12), and a flow-control active valve (28) for controlling flow of a damping fluid to and from the intermediate tube (22); the flow-control passive valve (32) is interposed between the intermediate tube (22) and the flow-control active valve (28) in series; the intermediate tube (22) defines the upstream space; and the flow-control active valve (28) defines the downstream space.

8. The shock absorber according to claim 7, wherein the valve body (34, 36) includes a bottom wall (38) having an opening (64) defining the first fixed restrictor (64), a top wall (42) having an opening (82) for connection with the downstream space (28), and a substantially cylindrical lateral wall (40); the chamber (46) of the valve body (34, 36) is a substantially cylindrical chamber defined by the bottom wall (38), by the top wall (42), and by the cylindrical lateral wall (40); the movable member (48) is slidable along a direction of an axis of the chamber (46) of the valve body (34, 36) and includes a bottom wall (50) facing the bottom wall (38) of the valve body (34, 36) and a substantially cylindrical lateral wall (52); the movable member (48) has a center hole (78) through which the chamber (46) is in fluid communication with the first space (62) via the second fixed restrictor (76) and the first variable restrictor (56, 72) as well as at least one opening (80) through which the chamber (46) is in fluid communication with the second space (66) via the third fixed restrictor (56, 40); the resiliency (54) applies on the movable member (48) the force tending to urge the bottom wall (50) of the movable member against the bottom wall (38) of the valve body (34, 36); the metering discs (56, 64, 68, 72, 76) further include at least one disc (56) that is substantially axially interposed between the bottom wall (38) of the valve body (34, 36) and the bottom wall (50) of the movable member (48) and has a center hole (74) in fluid communication with the center hole (78) of the bottom wall (50) of the movable member (48); and the at least one disc defines the second fixed restrictor (76), the first variable restrictor (56, 72), the second variable restrictor (56, 68), and the third fixed restrictor (56, 40).

9. The shock absorber according to claim 8, wherein the second fixed restrictor (76) is defined by at least one substantially radial opening (76) provided in the at least one disc (56), the radial opening (76) debouching into the center hole (74) of the at least one disc (56).

10. The shock absorber according to claim 8, wherein the first space (62) is a substantially annular cavity provided on a side of the bottom wall (38) of the valve body (34, 36) facing the chamber (46) and the first variable restrictor (56, 72) is defined between the at least one disc (56) and a first substantially annular projection (72) that is formed by the bottom wall (38) of the valve body (34, 36) and is delimited by a substantially radially inner edge of the annular cavity (62).

11. The shock absorber according to claim 10, wherein the second space (68) is a substantially annular cavity provided on the side of the bottom wall (38) of the valve body (34, 36) facing the chamber (46) substantially radially outwardly of the annular cavity (62) defining the first space, the bottom wall (38) of the valve body (34, 36) forms a second substantially annular projection (68) that divides the first and second spaces (62, 66), and the second variable restrictor (56, 68) is defined between the at least one disc (56) and the second annular projection (72).

12. The shock absorber according to claim 8, wherein the third fixed restrictor (56, 40) is defined between a radially outer edge of the at least one disc (56) and the cylindrical lateral wall (40) of the valve body (34, 36).

13. The shock absorber according to claim 8, wherein the valve body (34, 36) includes a first element (34) forming the bottom wall (38) and the cylindrical lateral wall (40) and a second element (36) forming the top wall (42), the first and second elements (34, 36) being secured to each other.

14. At least one of an active and a semi-active suspension system for a motor vehicle, the suspension system comprising:

at least one shock absorber including:

at least one flow-control passive valve (32) for controlling flow of a fluid between an upstream space (22) at high pressure ($p_H$) and a downstream space (28) at low pressure ($p_L$), the flow-control passive valve (32) having:

a valve body (34, 36) in fluid communication on one side (64) with the upstream space (22) and on another side (82) with the downstream space (28), a first space (62) and a second space (66) being defined within the valve body (34, 36);

a movable member (48) slidably received in a chamber (46) of the valve body (34, 36);

resiliency (54) applying on the movable member (48) a force tending to keep the movable member in a given "non-working" position; and metering discs (56, 64, 68, 72, 76) for metering the flow of the fluid from the upstream space (22) to the downstream space (28) through the valve body (34, 36), the metering discs (56, 64, 68, 72, 76) comprising:
- a first fixed restrictor (64) through which the first space (62) is in fluid communication with the upstream space (22);
- a second fixed restrictor (76) through which the first space (62) is in fluid communication with the downstream space (28);
- a first variable restrictor (56, 72) a restriction amount of which depends on a position of the movable member (48) and through which the first space (62) is in fluid communication with the downstream space (28) in substantial parallel to the second fixed restrictor (76);
- a second variable restrictor (56, 68) a restriction amount of which depends on the position of the movable member (48) and through which the first space (62) is in fluid communication with the second space (66); and
- a third fixed restrictor (56, 40) through which the second space (66) is in fluid communication with the downstream space (28), wherein a pressure ($p_1$) in the first space (62) is lower than a pressure in the upstream space (22) as a result of a pressure drop through the first fixed restrictor (64) while a pressure ($p_2$) and space (66) is variable between the pressure ($p_1$) in the first space (62) and the pressure ($p_L$) in the downstream space (28) depending on the position of the movable member (48);

wherein the valve body (34, 36) includes a bottom wall (38) having an opening (64) defining the first fixed restrictor (64), a top wall (42) having an opening (82) for connection with the downstream space (28), and a substantially cylindrical lateral wall (40); the chamber (46) of the valve body (34, 36) is a substantially cylindrical chamber defined by the bottom wall (38), by the top wall (42), and by the cylindrical lateral wall (40); the movable member (48) is slidable along a direction of an axis of the chamber (46) of the valve body (34, 36) and includes a bottom wall (50) facing the bottom wall (38) of the valve body (34, 36) and a substantially cylindrical lateral wall (52); the movable member (48) has a center hole (78) through which the chamber (46) is in fluid communication with the first space (62) via the second fixed restrictor (76) and the first variable restrictor (56, 72) as well as at least one opening (80) through which the chamber (46) is in fluid communication with the second space (66) via the third fixed restrictor (56, 40); the resiliency (54) applies on the movable member (48) the force tending to urge the bottom wall (50) of the movable member against the bottom wall (38) of the valve body (34, 36); the metering discs (56, 64, 68, 72, 76) further include at least one disc (56) that is substantially axially interposed between the bottom wall (38) of the valve body (34, 36) and the bottom wall (50) of the movable member (48) and has a center hole (74) in fluid communication with the center hole (78) of the bottom wall (50) of the movable member (48); and the at least one disc defines the second fixed restrictor (76), the first variable restrictor (56, 72), the second variable restrictor (56, 68), and the third fixed restrictor (56, 40).

15. The suspension system according to claim 14, wherein the second fixed restrictor (76) is defined by at least one substantially radial opening (76) provided in the at least one disc (56), the radial opening (76) debouching into the center hole (74) of the at least one disc (56).

16. The suspension system according to claim 14, wherein the first space (62) is a substantially annular cavity provided on a side of the bottom wall (38) of the valve body (34, 36) facing the chamber (46) and the first variable restrictor (56, 72) is defined between the at least one disc (56) and a first substantially annular projection (72) that is formed by the bottom wall (38) of the valve body (34, 36) and is delimited by a substantially radially inner edge of the annular cavity (62).

17. The suspension system according to claim 16, wherein the second space (68) is a substantially annular cavity provided on the side of the bottom wall (38) of the valve body (34, 36) facing the chamber (46) substantially radially outwardly of the annular cavity (62) defining the first space, the bottom wall (38) of the valve body (34, 36) forms a second substantially annular projection (68) that divides the first and second spaces (62, 66), and the second variable restrictor (56, 68) is defined between the at least one disc (56) and the second annular projection (72).

* * * * *

UNITED STATES PATENT AND TRADEMARK OFFICE
CERTIFICATE OF CORRECTION

PATENT NO. : 8,875,852 B2  
APPLICATION NO. : 13/393609  
DATED : November 4, 2014  
INVENTOR(S) : Walter Bruno et al.

Page 1 of 1

It is certified that error appears in the above-identified patent and that said Letters Patent is hereby corrected as shown below:

In the Claims

Column 9, line 35 delete "64" and insert therefor --(64)--.

Column 9, line 37 delete "(P1 in" and insert therefor --(P1) in--.

Column 11, line 27 delete "and space" and insert therefor --in the second space--.

Signed and Sealed this  
Twenty-first Day of April, 2015

Michelle K. Lee  
*Director of the United States Patent and Trademark Office*